(12) United States Patent
Roden, III et al.

(10) Patent No.: US 10,853,493 B2
(45) Date of Patent: Dec. 1, 2020

(54) ENHANCED VECTOR-BASED IDENTIFICATION OF CIRCUIT TROJANS

(71) Applicant: RAYTHEON BBN TECHNOLOGIES CORP., Cambridge, MA (US)

(72) Inventors: Thomas Gilbert Roden, III, New Windsor, MD (US); James Brian Schneider, Columbia, MD (US); Zachary Isaac Grove, Severn, MD (US)

(73) Assignee: Raytheon BBN Technologies Corp, Cambridge, MA (US)

( * ) Notice: Subject to any disclaimer, the term of this patent is extended or adjusted under 35 U.S.C. 154(b) by 296 days.

(21) Appl. No.: 15/728,469

(22) Filed: Oct. 9, 2017

(65) Prior Publication Data
US 2019/0108344 A1 Apr. 11, 2019

(51) Int. Cl.
| G06F 21/57 | (2013.01) |
| G06F 17/50 | (2006.01) |
| G06N 3/04 | (2006.01) |
| G06N 3/08 | (2006.01) |
| G06F 21/71 | (2013.01) |
| G06F 30/367 | (2020.01) |

(52) U.S. Cl.
CPC .............. *G06F 21/57* (2013.01); *G06F 21/71* (2013.01); *G06F 30/367* (2020.01); *G06N 3/04* (2013.01); *G06N 3/08* (2013.01); *G06F 2221/034* (2013.01)

(58) Field of Classification Search
CPC ...... G06F 21/57; G06F 17/5036; G06F 21/71; G06F 30/367; G06N 3/04; G06N 3/08
See application file for complete search history.

(56) References Cited

U.S. PATENT DOCUMENTS

| 2002/0093356 A1* | 7/2002 | Williams | G01R 31/31719 324/762.02 |
| 2014/0136900 A1* | 5/2014 | Wei | G06F 11/3692 714/37 |
| 2016/0012228 A1* | 1/2016 | Sethumadhavan | G06F 27/71 726/23 |
| 2016/0334467 A1* | 11/2016 | Cho | G06F 11/261 |
| 2018/0100894 A1* | 4/2018 | Venetsky | G01R 31/318364 |

OTHER PUBLICATIONS

Chawla, Nitesh V. et al., "SMOTE: Synthetic Minority Oversampling Technique", Journal of Artificial Intelligence Research, Jun. 2002, pp. 321-357, vol. 16, AI Access Foundation and Morgan Kaufmann Publishers.

* cited by examiner

*Primary Examiner* — Noura Zoubair
(74) *Attorney, Agent, or Firm* — Lewis Roca Rothgerber Christie LLP (57) ABSTRACT

A system and method for detecting Trojans and other intermittent severe defects in a digital circuit design. A simulation of the digital circuit design results in a value change dump file, which is compiled to form a value change summary file containing counts of the numbers of value changes for the signals in the digital circuit design. A discriminative neural network analyzes the value change summary file to determine whether an intermittent severe defect is present. A corpus of digital circuit designs, with and without intermittent severe defects, is used to train the discriminative neural network. The training process may involve dimensionality reduction of the data, enlargement of the data set, and data compression using an autoencoder.

13 Claims, 4 Drawing Sheets

ENHANCED VECTOR-BASED IDENTIFICATION OF CIRCUIT TROJANS

FIELD

One or more aspects of embodiments according to the present invention relate to design defects in digital circuits, and more particularly to a system and method for assessing whether a digital circuit is likely to contain such defects.

BACKGROUND

Commercial and military digital circuits may contain various design defects. Such defects may be relatively minor or relatively grave, and they may be unintentionally or intentionally introduced into the design. For example, a digital circuit may include malicious code, intentionally designed to cause the circuit to behave in a manner adverse to the interests of the party owning or operating the circuit. In sensitive systems, such defects may have severe consequence.

Thus, there is a need for a system and method for assessing whether a digital circuit is likely to contain design defects.

SUMMARY

Aspects of embodiments of the present disclosure are directed toward a system and method for detecting Trojans and other intermittent severe defects in a digital circuit design. A simulation of the digital circuit design results in a value change dump file, which is compiled to form a value change summary file containing counts of the numbers of value changes for the signals in the digital circuit design. A discriminative neural network analyzes the value change summary file to determine whether an intermittent severe defect is present. A corpus of digital circuit designs, with and without intermittent severe defects, is used to train the discriminative neural network. The training process may involve dimensionality reduction of the data, enlargement of the data set, and data compression using an autoencoder.

According to an embodiment of the present invention there is provided a method for analyzing a digital circuit design, the method including: forming a record of value changes of a plurality of signals in the digital circuit design during a simulated time interval; feeding the record of value changes to a discriminative neural network; and determining, by the discriminative neural network, whether the digital circuit design has intermittent severe defects.

In one embodiment, the forming of the record of value changes includes performing a simulation simulating the digital circuit design during the simulated time interval to generate a test value change dump record.

In one embodiment, the method includes information about the number of value changes, during the simulated time interval, of each signal of the plurality of signals, and wherein the record of value changes is the test value change summary record.

In one embodiment, the test value change summary record includes, for each of the plurality of signals, a count of the number of value changes of the signal during the simulated time interval.

In one embodiment, the test value change summary record further includes, for each of the plurality of signals: a count of the number of value changes to a value of true; a count of the number of value changes to a value of false; a count of the number of value changes to a value of unknown; and a count of the number of value changes to a value of high impedance.

In one embodiment, the method includes, before feeding the record of value changes to the discriminative neural network, training the discriminative neural network with a plurality of training value change summary records, each of the training value change summary records corresponding to a respective one of a first plurality of training digital circuit designs, each of the training digital circuit designs being selected from: a first set of training digital circuit designs, each of the first set of training digital circuit designs having an intermittent severe defect, or a second set of training digital circuit designs, each of the second set of training digital circuit designs not having any intermittent severe defect.

In one embodiment, the method includes, before training the discriminative neural network, generating an enlarged data set from a second plurality of training digital circuit designs; and training an autoencoder with the enlarged data set.

In one embodiment, the second plurality of training digital circuit designs is the first plurality of training digital circuit designs.

In one embodiment, the method includes, after training the autoencoder, copying a weight from an artificial neuron of the autoencoder to a corresponding artificial neuron of the discriminative neural network.

In one embodiment, the generating of the enlarged data set includes: simulating each of the training digital circuit designs to form a respective one of a plurality of training value change dump records; and compiling each of the plurality of training value change dump records to form a respective one of a plurality of training value change summary records.

In one embodiment, the generating of the enlarged data set further includes performing dimensionality reduction of each of the training value change summary records to form transformed data.

In one embodiment, the transformed data includes a plurality of points, and the generating of the enlarged data set further includes: for pairs of points selected from among the plurality of points, forming a plurality of randomly interpolated points, each randomly interpolated point being a weighted sum of the two points of a pair points, at least one of the weights in the weighted sum being a pseudorandom number; and supplementing the transformed data with the randomly interpolated points.

In one embodiment, the method includes: fabricating a digital circuit based on the digital circuit design, if the digital circuit design does not have intermittent severe defects; and not fabricating a digital circuit based on the digital circuit design, if the digital circuit design has intermittent severe defects.

According to an embodiment of the present invention there is provided a system for analyzing a digital circuit design, the system including: a first processing circuit; and a second processing circuit, the first processing circuit being configured to form a record of value changes of a plurality of signals in the digital circuit design during a simulated time interval, and the second processing circuit being configured to: instantiate a first discriminative neural network; feed the record of value changes to the first discriminative neural network; and determine, by operating the first discriminative neural network, whether the digital circuit design has intermittent severe defects.

In one embodiment, the second processing circuit is the same processing circuit as the first processing circuit.

In one embodiment, the system includes information about the number of value changes, during the simulated time interval, of each signal of the plurality of signals, wherein the record of value changes is the test value change summary record.

In one embodiment, the test value change summary record includes, for each of the plurality of signals, a count of the number of value changes of the signal during the simulated time interval.

In one embodiment, the system includes a third processing circuit configured to train a second discriminative neural network with a plurality of training value change summary records, each of the training value change summary records corresponding to a respective one of a first plurality of training digital circuit designs, each of the training digital circuit designs being selected from: a first set of training digital circuit designs, each of the first set of training digital circuit designs having an intermittent severe defect, or a second set of training digital circuit designs, each of the second set of training digital circuit designs not having any intermittent severe defect.

In one embodiment, the third processing circuit is the same processing circuit as the second processing circuit; or the second discriminative neural network is the same discriminative neural network as the first discriminative neural network; or each neuron of the first discriminative neural network has a weight that is the same as a weight of a corresponding artificial neuron of the second discriminative neural network.

In one embodiment, the third processing circuit is further configured to: generate an enlarged data set from a second plurality of training digital circuit designs; and train an autoencoder with the enlarged data set.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for identifying intermittent severe defects in a digital circuit design provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Complex digital circuits may contain design defects of various kinds that may be inadvertently or intentionally introduced. For example, a digital circuit may be designed using building blocks, that may be referred to as "IP building blocks", available from vendors of such design elements, and an evaluation version of such IP building blocks may have limited functionality or other characteristics that make it unsuitable for a final product. An evaluation version of an IP building block may, for example, cease operating entirely once a predetermined number of operations have been performed, or an evaluation version of an IP building block that has access to time (e.g., one that uses time for its operations) may stop operating at a predetermined time. These characteristics may not interfere with the intended use of these IP building blocks, i.e., evaluation by engineers, but if such an IP building block is inadvertently included in a production design it may lead to system failure.

Malicious functionality may also be present in a digital circuit, as a result of the actions of a malicious designer, either during the design of the digital circuit, or during the design of one of its building blocks. Such malicious code may result in any of a broad range of harmful behaviors, such as theft of data being processed by the digital circuit, and delivery of the data to a predetermined internet protocol (IP) address operated by a malicious actor, or providing access, or a "backdoor", to the functions and/or programming of the digital circuit by a malicious actor.

Design defects in these categories may not be immediately apparent during the operation of the circuit, so that a circuit with such a defect may operate apparently flawlessly for an extended period of time, and then nonetheless engage in malicious behavior when triggered by a suitable change in state. This ability or tendency to operate normally may be an obstacle to detection of the defect. Defects that are not manifested at the external interfaces during normal operation of the digital circuit but that may, on occasion, e.g., after the occurrence of a trigger state, result in severe abnormal (e.g., malicious) behavior, are referred to herein as "intermittent severe defects".

Simulation of a digital circuit design may make it possible not only to monitor the signals at external inputs and outputs of the digital circuit, but also to monitor internal signals. As used here, a "signal" corresponds to a conductor in a digital circuit design. A hardware description language may refer to such conductors using terms such as (e.g., in Verilog) "reg" or "wire", or using terms such as (e.g., in VHDL) "signal". The conductor may generally be one of four values: logical high (or "1" or Boolean "true"), logical low (or "0" or Boolean "false"), unknown ("X"), or high impedance ("Z"). Simulation software may be used to simulate the states and state changes of each signal in the digital circuit when the circuit is, at the beginning of the simulation, in a certain initial state, and is subsequently exposed to various signals at its external inputs.

In principle, simulation of a digital circuit design with an intermittent severe defect from a suitable initial state, and with suitable inputs during the simulation, will cause the digital circuit to produce readily recognizable symptoms of the intermittent severe defect, such as ceasing normal operations, or attempting to contact an IP address that would not be accessed during normal operation. Identifying a suitable initial state and suitable inputs may be challenging, however, in part because the defect may be designed to remain hidden and dormant until some trigger condition is present. Other indirect indications of the intermittent severe defect may be present in the simulation, however. For example, if ten percent of a digital circuit design is dedicated to a malicious function, such as sending proprietary information to a predetermined IP address, then this ten percent of the digital circuit design may be entirely inactive during any simulation run in which the trigger condition does not occur, and the malicious function is not activated. In this example, the presence of a substantial quantity of inactive circuitry may be an indication that an intermittent severe defect is present. Various other indirect indications potentially indicate the presence of an intermittent severe defect, and in some embodiments a machine learning system (e.g., a neural network), is employed, as discussed in further detail below, to recognize such indications and to determine whether or not a digital circuit design has an intermittent severe defect.

Digital circuit designs may be represented in various ways, including hardware description languages, such as Very High Speed Integrated Circuit (VHSIC) Hardware Description Language (VHDL) and Verilog, and schematic diagrams. A simulation may use a representation of the design of the digital circuit, together with a simulation scenario defining input signals at the external inputs of the digital circuit during a simulation interval, to simulate the behavior of the digital circuit during the simulation interval. The result of such a simulation may be saved in a file referred to as a value change dump (VCD) file. The VCD file may contain a record of each value change of each signal in the circuit; for each value change it may contain (i) the time at which the change occurred and (ii) the value to which the signal changed (the value before the value change being the value to which the signal changed during the previous value change). The VCD file may also contain the initial value of each signal.

The word "file" in the term "value change dump file" may connote storage in a persistent storage device, but the invention is not limited to such an embodiment, and in some embodiments the output of the simulation is not stored in a persistent storage device. Accordingly, the term "record" is used herein to refer to data that may or may not be stored in a file in persistent storage; e.g., a "value change dump record" is a collection of value change data that may be stored in persistent storage (and referred to as a value change dump file), or that may be stored elsewhere, e.g., in memory. The simulation described above, and various other analysis processes, may be performed to determine whether a particular digital circuit design has an intermittent severe defect, and in this case the value change dump record and other intermediate data products may be qualified with the adjective "test" to distinguish them from otherwise similar data, qualified with the adjective "training", obtained, for purposes of training the neural network, from a corpus of digital circuit designs for which it is known whether or not they have intermittent severe defects. For example, a value change dump record obtained for a digital circuit design from the corpus may be referred to as a "training value change dump record" and a value change dump record obtained for a digital circuit design being analyzed to determine whether it has an intermittent severe defect may be referred to as a "test value change dump record".

An excerpt from an exemplary VCD file is shown in Table 1 below. The file includes abbreviated signal name definitions and lines with indications of signal value changes, referenced to the abbreviated signal names.

TABLE 1

$timescale
 1ps
$end
$scope module tb_TOP $end
$var wire 128 ! out [127:0] $end
$var wire 64 " Capacitance [63:0] $end
$var reg 1 # clk $end
$var reg 128 $ key [127:0] $end
$var reg 1 % rst $end
$var reg 128 & state [127:0] $end As a result of its organization, the VCD file may not be well suited to direct analysis for characteristics that may signal the presence of intermittent defects. Accordingly a process for compiling the VCD file into a different format, referred to herein as a "value change summary file", as a "value change summary record" or as an "EVICT" file ("EVICT" being an acronym for "Enhanced Vector-based Identification of Circuit Trojans"), may be used. As is the case for the value change dump record, the value change summary record may be referred to as a "training value change summary record" when used for training a neural network or as a "test value change summary record" when used to analyze a digital circuit design. The EVICT file may contain all of the value change information of the VCD file, represented in a format that is more suitable for subsequent analysis. The EVICT file may include a plurality of data structures each of a type named SignalHistory, illustrated in FIG. 1, there being one such time record for each of the signals in the digital circuit design. Each data structure of the type named SignalHistory includes a map of type SignalRecord and a vector of structures each being of type TimeRecord.

Figure 1:
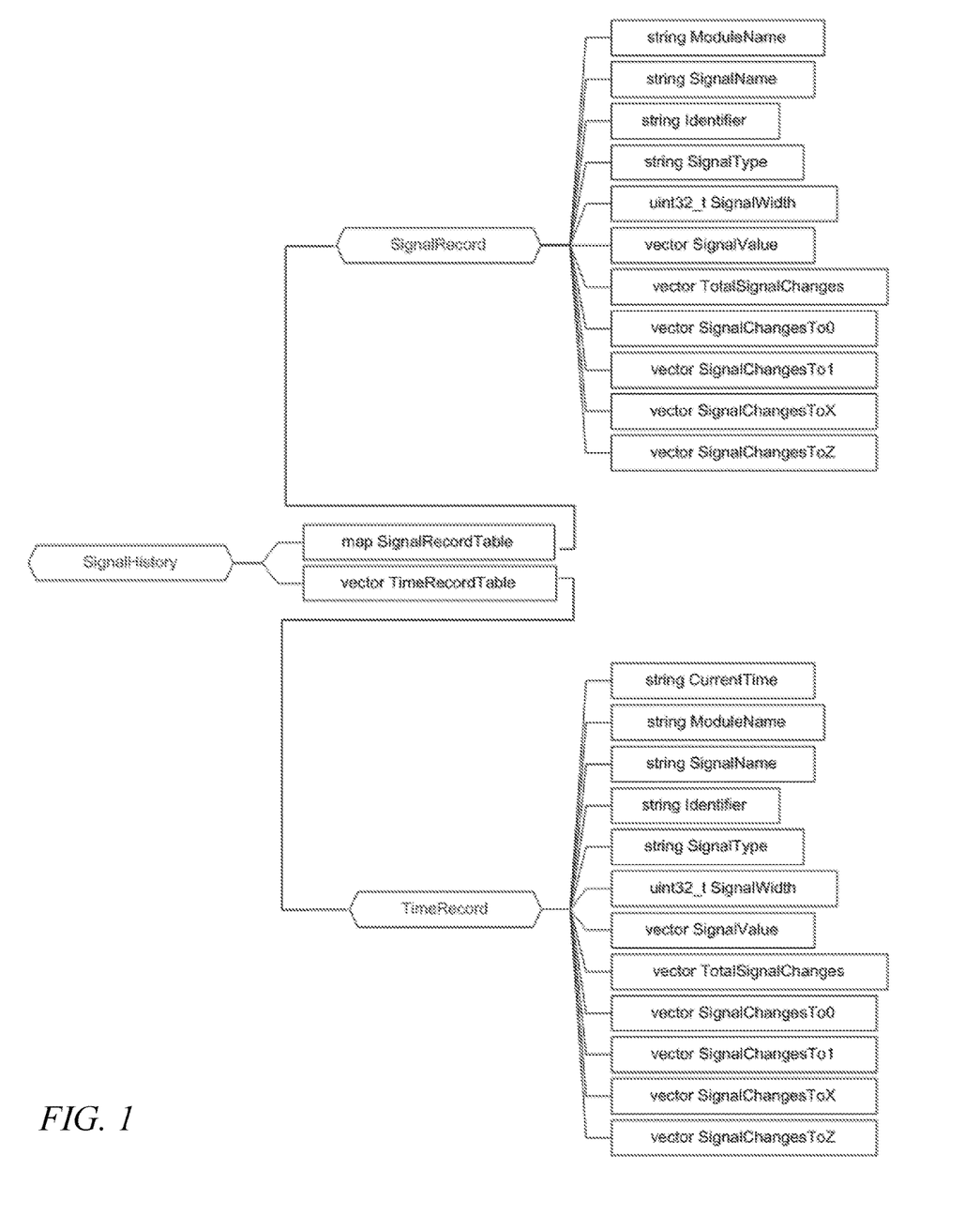
FIG. 1 is a data structure diagram, according to an embodiment of the present invention.

The vector TimeRecordTable may be a vector of records (which may be referred to as "time records"), each being a data structure of type TimeRecord, there being at least one time record in the table for each time entry in the VCD file (i.e., for each simulation time point at which the value of any signal in the digital circuit changed). Each of the time records includes, as shown in FIG. 1, twelve fields, named CurrentTime, ModuleName, SignalName, Identifier, SignalType, SignalWidth, SignalValue, TotalSignalChanges, SignalChangesToO, SignalChangesToI, SignalChangesToX, and SignalChangesToZ. The field CurrentTime contains the simulation time to which the time record corresponds, ModuleName and SignalName identify the signal, SignalWidth specifies the width of the signal (in bits), and SignalValue gives the value of the signal at a simulation time equal to CurrentTime. The field TotalSignalChanges is a count of the number times the value of the signal changes, during the portion of the simulated time interval preceding CurrentTime. Similarly, SignalChangesTo, SignalChangesToI, SignalChangesToX, and SignalChangesToZ, are counts of the number times the value of the signal changes to 0, 1, X, and Z, respectively, during the portion of the simulated time interval preceding CurrentTime. If the width of a signal is greater than 1, then each of TotalSignalChanges SignalChangesTo, SignalChangesToI, SignalChangesToX, and SignalChangesToZ is a vector of the same width, each element of the vector corresponding to a respective bit of the signal. The structure SignalRecord contains the same fields as a TimeRecord structure except for the field CurrentTime. Each of the fields of the SignalRecord structure stores the same value as the corresponding field of the last time record for the same signal.

Listing 1 is a listing of pseudocode for the compiler, or "EVICT compiler" that generates an EVICT file from a VCD file. In Listing 1, lines 24-56 define the SignalRecord structure and lines 59-93 define the TimeRecord structure. The main program of Listing 1 begins on line 117, and lines 126-132 parse the VCD file, with repeated calls to get_next_lexical_token( ) and parse( ). The method parse( ) is defined in lines 140-163; this function may be generated by an open-source parser such as Bison. The method store_signal_record( ) is defined on lines 166-171; this method is called when appropriate, by parse( ), to store a signal record. The method store_time_record( ) is defined on lines 174-183; this method is called when appropriate, by parse( ), to store a time record. The method transform_data_to_evict_format and write_file( ) is defined on lines 186-196; this method is called at the end of the main program to write the output of the compiler to the EVICT file.

Once the simulation has been completed and the results have been stored in the EVICT file, a neural network system may be used to analyze the EVICT file and form an assessment of whether the digital circuit design has intermittent severe defects. The process may proceed as follows, illustrated herein with an example. The example presented below is simplified for ease of presentation; a digital circuit design potentially containing intermittent severe defects would generally be greatly more complex and include far more signals.

Table 2 shows the total number of value changes of each of five signals, to each of the four different values a signal may take. In this highly simplified example all of the entries or counts are either 0 or 1; in other simulation results the counts may be significantly greater than 1, and a signal may change, e.g., to a value of True, thousands or millions of times (or more) during a simulated time interval.

TABLE 2

|  | Boolean True | Boolean False | Unknown | High Impedance |
|---|---|---|---|---|
| Signal A | 1 | 1 | 1 | 1 |
| Signal B | 1 | 0 | 0 | 1 |
| Signal C | 1 | 1 | 0 | 0 |
| Signal D | 1 | 1 | 1 | 0 |
| Signal E | 1 | 0 | 1 | 1 |

These counts of value changes may be read from the EVICT file, and converted into a matrix, referred to as a "value change matrix", as follows:

$$\text{Input} = \begin{bmatrix} 1 & 1 & 1 & 1 \\ 1 & 0 & 0 & 1 \\ 1 & 1 & 0 & 0 \\ 1 & 1 & 1 & 0 \\ 1 & 0 & 1 & 1 \end{bmatrix}$$

Figure 2A:
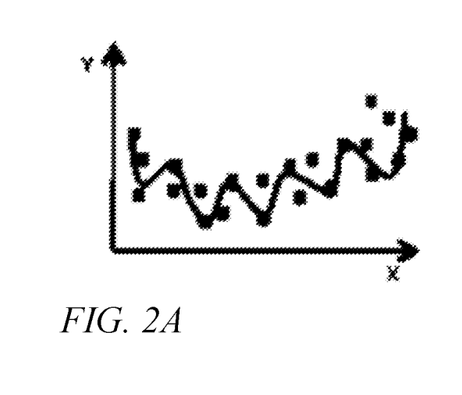
FIG. 2A is a graph showing overfitting, according to an embodiment of the present invention.
Figure 2B:
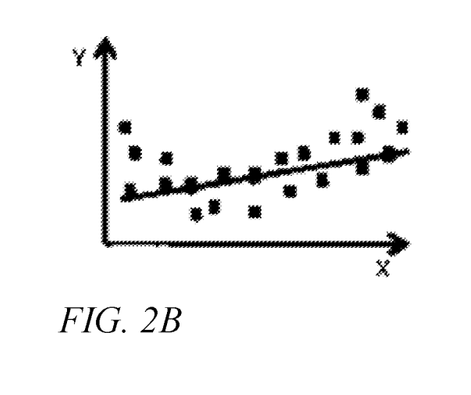
FIG. 2B is a graph showing underfitting, according to an embodiment of the present invention.
Figure 2C:
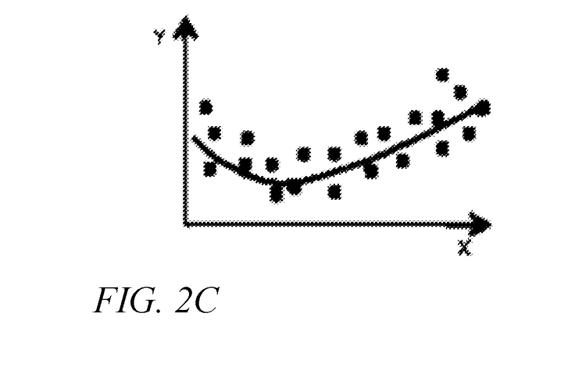
FIG. 2C is a graph in which neither overfitting nor underfitting is apparent, according to an embodiment of the present invention.

Several steps may then be taken to perform dimensionality reduction or simplification on the data. The reasons for dimensionality reduction are that it reduces the likelihood of over and under fitting. Overfitting, illustrated in FIG. 2A, is broadly defined as a model that performs well on its data, but poorly on other data. Reduction of overfitting may improve the results achieved with model generalization and dimensionality reduction may accomplish this by removing collinear data (data that behaves the same given the same stimuli). Under fitting, illustrated in FIG. 2B, is the opposite problem; under fitting may cause the model to perform worse on its data than expected. This may be primarily due to the data being sparse with few instances of correlations amongst the examples. FIG. 2C shows a fit to the same data as that of FIGS. 2A and 2B; in the fit of FIG. 2C neither overfitting nor underfitting is apparent.

The steps taken to perform dimensionality reduction may include (i) performing a singular value decomposition of the value change matrix to produce left eigenvectors, an eigenvalues matrix, and right eigenvectors, (ii) reducing the eigenvalues matrix, and (iii) forming a transformed input, as the product of the value change matrix and the right eigenvectors. These steps may be performed both for data from digital circuit designs known to be free of intermittent severe defects and for data from digital circuit designs known to include intermittent severe defects.

For the example of the value change matrix above, the first step may result in the following singular value decomposition:

$$\text{Input} = \begin{bmatrix} 1 & 1 & 1 & 1 \\ 1 & 0 & 0 & 1 \\ 1 & 1 & 0 & 0 \\ 1 & 1 & 1 & 0 \\ 1 & 0 & 1 & 1 \end{bmatrix} = \begin{pmatrix} -.59 & 0 & .18 & -.78 \\ -.32 & -.5 & -.61 & .10 \\ -.32 & .5 & -.61 & .10 \\ -.46 & .5 & .31 & .42 \\ -.46 & -.5 & .31 & .42 \end{pmatrix} *$$

$$\begin{pmatrix} 3.3 & 0 & 0 & 0 \\ 0 & 1.4 & 0 & 0 \\ 0 & 0 & .93 & 0 \\ 0 & 0 & 0 & .45 \end{pmatrix} * \begin{pmatrix} -.65 & -.41 & -.46 & -.41 \\ 0 & -.70 & 0 & .70 \\ -.45 & -.12 & .87 & -.12 \\ .60 & -.55 & .14 & -.55 \end{pmatrix}$$

Reducing the eigenvalues matrix to the largest two values (e.g. from N×N to 2×2) and reducing left and right eigenvectors to N×2 and 2×4 respectively (with N=5 in this example) results in the following reduced decomposition:

$$\text{Input} = \begin{bmatrix} 1 & 1 & 1 & 1 \\ 1 & 0 & 0 & 1 \\ 1 & 1 & 0 & 0 \\ 1 & 1 & 1 & 0 \\ 1 & 0 & 1 & 1 \end{bmatrix} =$$

$$\begin{pmatrix} -.59 & 0 \\ -.32 & -.5 \\ -.32 & .5 \\ -.46 & .5 \\ -.46 & -.5 \end{pmatrix} * \begin{pmatrix} 3.3 & 0 \\ 0 & 1.4 \end{pmatrix} * \begin{pmatrix} -.65 & -.41 & -.46 & -.41 \\ 0 & -.70 & 0 & .70 \end{pmatrix}$$

The step of taking the matrix of right eigenvectors and multiplying it by the original input matrix, may correspond, in the numerical example described here, to the following operation:

Input = (Original Input) * (Right Eienvectors) = Transformed Input $$\text{Input} = \begin{bmatrix} 1 & 1 & 1 & 1 \\ 1 & 0 & 0 & 1 \\ 1 & 1 & 0 & 0 \\ 1 & 1 & 1 & 0 \\ 1 & 0 & 1 & 1 \end{bmatrix} * \begin{pmatrix} -.65 & -.41 & -.46 & -.41 \\ 0 & -.70 & 0 & .70 \end{pmatrix} = \begin{bmatrix} -1.9 & 0 \\ -1.1 & .71 \\ -1.1 & -.71 \\ -1.5 & -.71 \\ -1.5 & .71 \end{bmatrix}$$

As a result, the transformed input for the present numerical example, which may correspond to a digital circuit design without intermittent severe defects, and for another example corresponding to a digital circuit design with intermittent severe defects, may be $$\text{Input No Trojan} = \begin{bmatrix} -1.9 & 0 \\ -1.1 & .71 \\ -1.1 & -.71 \\ -1.5 & -.71 \\ -1.5 & .71 \end{bmatrix} \text{Input Trojan} = \begin{bmatrix} -3.9 & .83 \\ 0 & 0 \\ -.22 & -1.1 \\ -2.1 & -.55 \\ -.62 & -2.9 \end{bmatrix},$$

In further steps, additional data may be generated, for training neural networks, as described in further detail below. Large amounts of data may be used to train neural networks, so that the neural networks may be able to discover the underlying model to ensure that the model works under all variations present in unseen data. A method referred to as a Synthetic Minority Over-Sampling Technique (SMOTE) may be employed to create such large amounts of synthetic data, by perturbation of the original data. The original data may be a corpus of digital circuit designs including 800 digital circuit designs without intermittent severe defects and 800 digital circuit designs with intermittent severe defects, the latter having been generated from the former by the intentional introduction of intermittent severe defects.

The use of the Synthetic Minority Over-Sampling Technique may proceed as follows. First the transformed input vector for a digital circuit design without intermittent severe defects may be concatenated with the transformed input vector for the digital circuit design modified to include intermittent severe defects. A label vector, which contains 1 for rows corresponding to digital circuit design without intermittent severe defects and 0 for rows corresponding to the digital circuit design modified to include intermittent severe defects, may be formed. Numerically, this may result in the following matrix and label vector:

$$\text{Concatenate} = \begin{bmatrix} -1.9 & 0 \\ -1.1 & .71 \\ -1.1 & -.71 \\ -1.5 & -.71 \\ -1.5 & .71 \\ -3.9 & .83 \\ 0 & 0 \\ -.22 & -1.1 \\ -2.1 & -.55 \\ -.62 & -2.9 \end{bmatrix} \text{Labels} = \begin{bmatrix} 1 \\ 1 \\ 1 \\ 1 \\ 1 \\ 0 \\ 0 \\ 0 \\ 0 \\ 0 \end{bmatrix}$$

The Manhattan distance between each set of points may then be calculated. This calculation of Manhattan distances is performed for each pair (of the 10 choose 2 pairs, in this example) in the concatenated set of points. The two points that are the closest may be selected, e.g.:

| Point 1 | Point 2 | Distance |
|---|---|---|
| (−1.959, 0.000) → | (−1.078, .707) = | 1.588 |
| (−1.959, 0.000) → | (−1.540, −.70) = | 1.126 |

In this example the latter pair of points consists of two points separated by a smaller Manhattan difference, and is selected.

A random interpolation is then performed between the two selected points, by taking their weighted sum, with the first weight being 1 and the second weight being a random number (e.g., a pseudorandom number) between 0 and 1, as follows:

$x_{new}, y_{new} = (-1.959, 0.000) + \text{rand}(0,1)*(-1.540, -0.707) = (-2.729, -0.3535)$ The label of the first parent point (i.e., the first point, for which the weight is 1; in this case the label 1) may then be assigned to the result of the random interpolation. Both parent points may have the same label. This process may be repeated a large number of times (e.g., 100,000 times), each time with a different random number to generate a large set of data.

From the large set of data (e.g., the 100,000 points) generated using this method, generated points that are within a user specified distance of an original point but have a different label from that of the original point may then be deleted.

Figure 3:
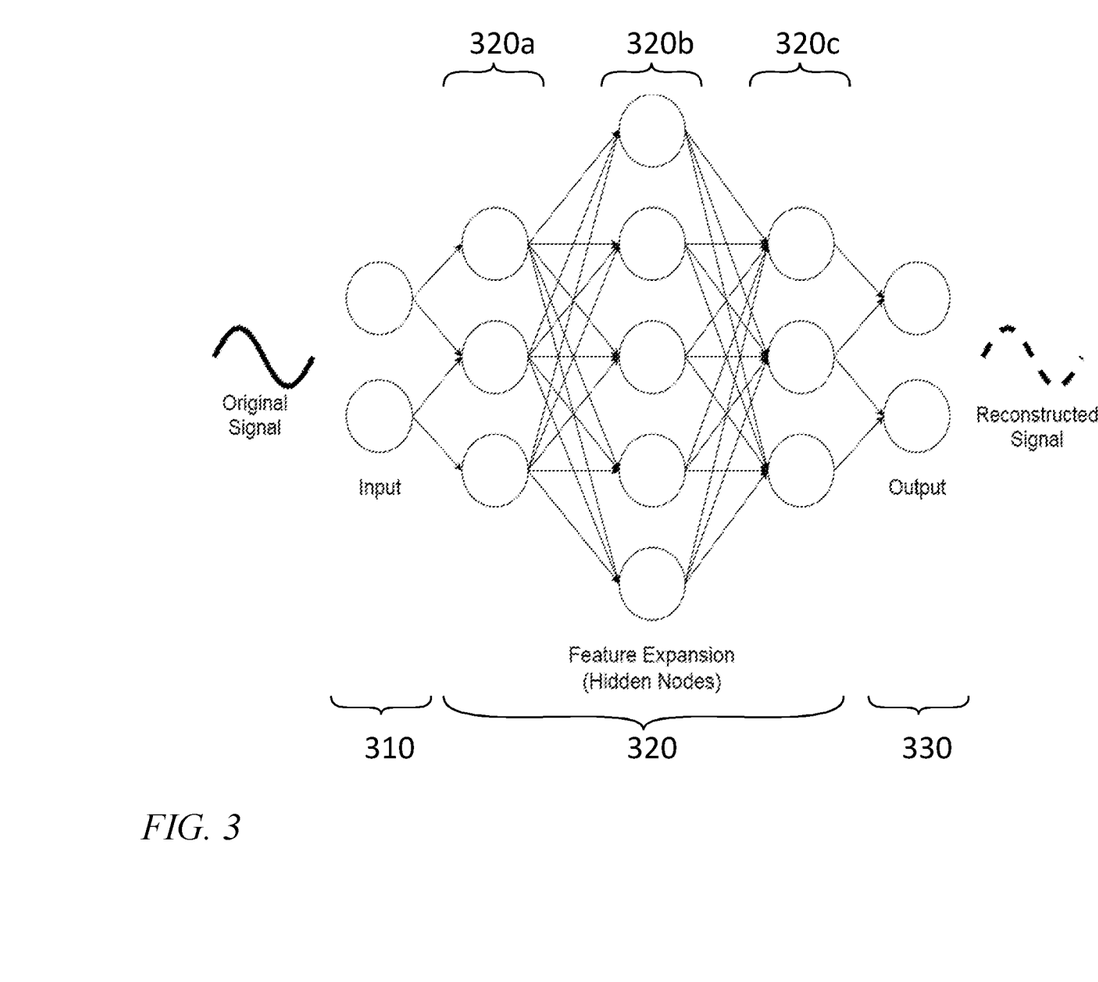
FIG. 3 is a schematic illustration of an autoencoder, according to an embodiment of the present invention.

The enlarged data set (generated for example using the Synthetic Minority Over-Sampling Technique, as described above), may then be used to generate a model that detects indications of intermittent severe defects in new data. Referring to FIG. 3, an autoencoder may be used as part of the process of generating such a model. An autoencoder is a neural network that mimics traditional compression technologies, but with the key difference of learning unique compression heuristics depending on the data being presented. Like the discriminative neural network discussed in further detail below, the autoencoder may include a plurality of input nodes 310, a plurality of hidden nodes 320, and a plurality of output nodes 330. Each node may be an artificial neuron including a weight, and a thresholding function. In operation, the artificial neuron may multiply a signal at its input by the weight, and apply the thresholding function to the product to form the output of the artificial neuron. The hidden nodes may be organized and connected as a plurality of layers 320a, 320b, 320c as shown.

The autoencoder may be trained with a set of data, using an unsupervised learning process, to generate at its output a signal that approximates the signal at its input. Because the neural network of the autoencoder may have a number of weights that is significantly smaller than the number of degrees of freedom of the input data, the autoencoder, once trained, may act as a compressed representation of the data set. The compression heuristic may then be extracted from the autoencoder and used to define the area of possible behaviors of both digital circuit designs with intermittent severe defects and digital circuit designs without intermittent severe defects.

Figure 4:
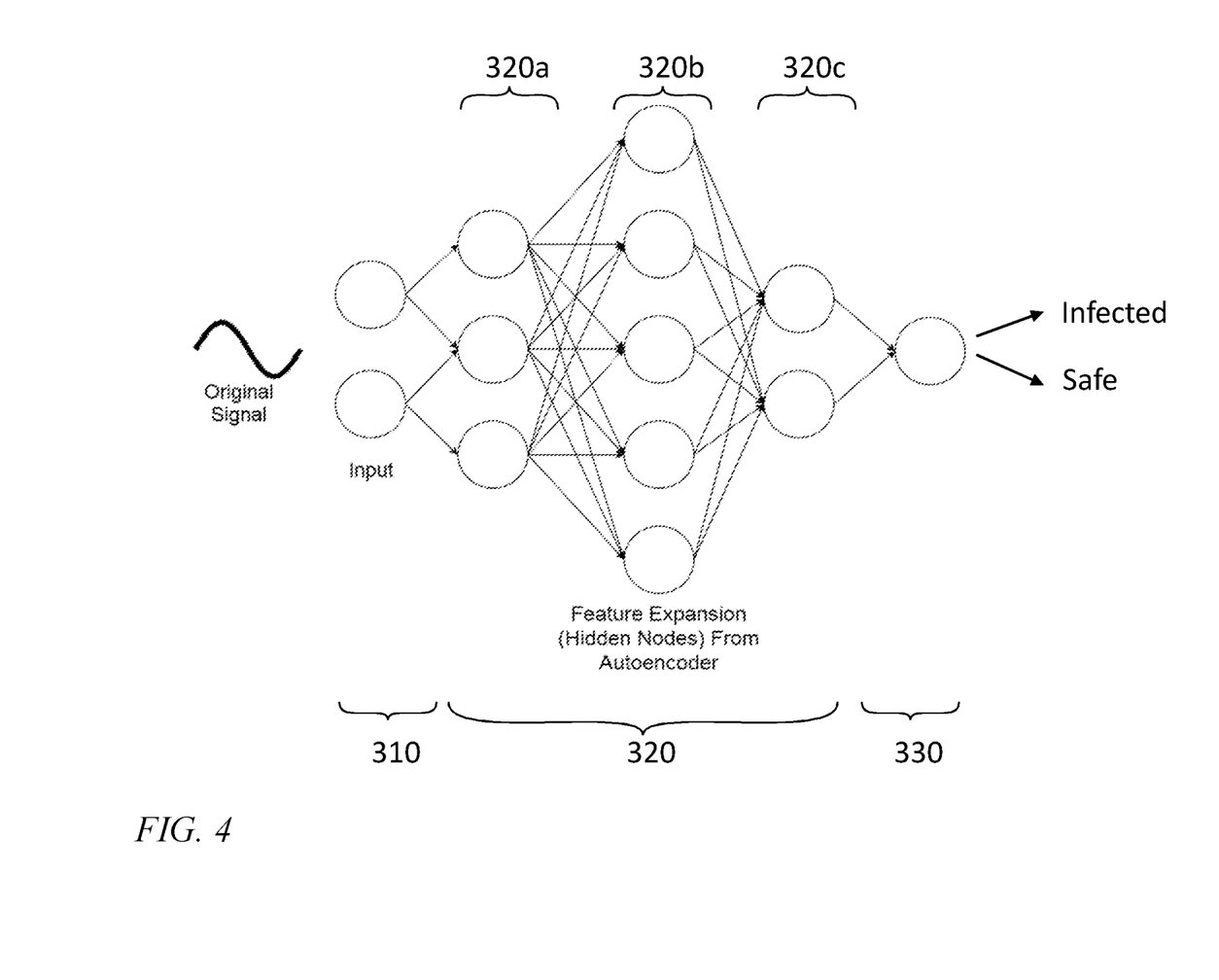
FIG. 4 is a schematic illustration of a discriminative neural network, according to an embodiment of the present invention.

The compression heuristic may then be transferred to a second neural network, which may be a discriminative neural network such as that illustrated in FIG. 4. This may be accomplished, for example, by copying the weights from the autoencoder into the discriminative neural network. In some embodiments, any node for which the weight is near zero (e.g., having an absolute value less than 0.005) may be deleted from the discriminative neural network; this may result in the discriminative neural network's having fewer hidden nodes than the autoencoder (as illustrated in the example of FIGS. 3 and 4); in other embodiments, the number of hidden nodes in the discriminative neural network may be the same as the number of hidden nodes in the autoencoder. The discriminative neural network may then be trained, in a supervised learning process, using the transformed data from each of the corpus of digital circuit designs including digital circuit designs without intermittent severe defects and digital circuit designs with intermittent severe defects. During this supervised training process, the weights of the discriminative neural network may be further adjusted and a threshold may be selected to discriminate between values, at the output of the discriminative neural network, corresponding to circuit designs without intermittent severe defects and values corresponding to digital circuit designs with intermittent severe defects. This training process may be performed to maximize the receiver operating characteristic of the system.

In operation, the EVICT file corresponding to a digital circuit design being analyzed is processed in the same manner, with dimensionality reduction (using singular value decomposition, eigenvalue matrix reduction, and multiplication of the value change matrix by the reduced right eigenvector matrix) to form a matrix of transformed input values, which may then be fed to the discriminative neural network. The output of the discriminative neural network then signals (i) that the digital circuit design appears to have an intermittent severe defect, if the output value of the discriminative neural network exceeds the threshold, or (ii) that the digital circuit design appears not to have intermittent severe defects, if the output value of the discriminative neural network falls below the threshold. Such an analysis may be performed before a circuit is fabricated according to the digital circuit design; if it is determined that the digital circuit design is free from intermittent severe defects, the circuit may be fabricated (e.g., fabricated as a hard-wired integrated circuit, or fabricated by suitably programming a field programmable gate array (FPGA)); if it is determined that the digital circuit design has an intermittent severe defect, then of the digital circuit design may be left unfabricated.

Some or all of the methods disclosed herein may be performed with or by one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB. For example, the data processing and training steps employed to generate the weights and threshold of the discriminative neural network may be performed in a first processing circuit, and the operation of the discriminative neural network to identify digital circuit designs having intermittent severe defects may be performed in a second processing circuit.

In some embodiments, some elements of the system, such as the neural networks, may be implemented in part in analog components. For example, each artificial neuron of the neural network may employ an analog multiplier to apply an analog weight (e.g., a weight generated by a digital to analog converter) and an analog circuit to provide the thresholding function of the neural network.

It will be understood that although collections of numbers are represented in the examples herein as vectors or matrices, these collections of numbers may be stored in a computer, memory, or processing circuit in any of various ways including being stored in a sequence of contiguous memory locations, in a linked list, or the like, and terms such as "matrix" and "vector" will be understood to refer to collections of numbers regardless of how they are stored or represented in a computer, memory, or processing circuit.

Although limited embodiments of a system and method for identifying intermittent severe defects in a digital circuit design have been specifically described and illustrated herein, many modifications and variations will be apparent to those skilled in the art. Accordingly, it is to be understood that a system and method for identifying intermittent severe defects in a digital circuit design employed according to principles of this invention may be embodied other than as specifically described herein. The invention is also defined in the following claims, and equivalents thereof.

APPENDIX: Listing 1

```
1   //////////////////////////////////////////////////////////////
2   // Pseudo code for the EVICT VCD lexical analyzer, parser, compiler and
3   // data transformer.
4   //
5   // This code is intended to provide the logical flow
6   // of an embodiment of the invention.
7   //
8   // Methods and constructs which are obvious to one skilled in the art
9   // are not elaborated.
10  //////////////////////////////////////////////////////////////
11
12  //
13  // Pseudo code format:
14  //   Keywords are in UPPERCASE.
15  //   User defined types are in UPPERCASE with _TYPE as a suffix.
16  //   Constants are of the form ___UPPERCASE___.
17  //   Operators have the same semantics as in 'C'.
18  //
19
20  //
21  // System variables and types are here.
22  //
```

-continued

| APPENDIX: Listing 1 |
|---|

```
23
24   RECORD SIGNAL_RECORD_TYPE
25       STRING          module_name;
26       STRING          signal_name;
27       STRING          identifier;
28       STRING          signal_type;
29
30       // The number of bits in the signal (1 for scalars, N for vectors).
31       INTEGER signal_width;
32
33       // An array of signal values for each bit in the signal.
34       // Indexed by signal bit position (left-most bit first).
35       LIST<INTEGER> signal_value;
36
37       // An array that holds the total number of signal changes for each bit in the signal.
38       // Indexed by signal bit position (left-most bit first).
39       LIST<INTEGER> total_signal_changes;
40
41       // An array that holds the signal change to '0' count for each bit in the signal.
42       // Indexed by signal bit position (left-most bit first).
43       LIST<INTEGER> signal_changes_to_0;
44
45       // An array that holds the signal change to '1' count for each bit in the signal.
46       // Indexed by signal bit position (left-most bit first).
47       LIST<INTEGER> signal_changes_to_1;
48
49       // An array that holds the signal change to 'X' count for each bit in the signal.
50       // Indexed by signal bit position (left-most bit first).
51       LIST<INTEGER> signal_changes_to_x;
52
53       // An array that holds the signal change to 'Z' count for each bit in the signal.
54       // Indexed by signal bit position (left-most bit first).
55       LIST<INTEGER> signal_changes_to_z;
56   END RECORD;
57
58
59   RECORD TIME_RECORD_TYPE
60       STRING          current_time;
61
62       STRING          module_name;
63       STRING          signal_name;
64       STRING          identifier;
65       STRING          signal_type;
66
67       // The number of bits in the signal (1 for scalars, N for vectors).
68       INTEGER signal_width;
69
70       // An array of signal values for each bit in the signal.
71       // Indexed by signal bit position (left-most bit first).
72       LIST<INTEGER> signal_value;
73
74       // An array that holds the total number of signal changes for each bit in the signal.
75       // Indexed by signal bit position (left-most bit first).
76       LIST<INTEGER> total_signal_changes;
77
78       // An array that holds the signal change to '0' count for each bit in the signal.
79       // Indexed by signal bit position (left-most bit first).
80       LIST<INTEGER> signal_changes_to_0;
81
82       // An array that holds the signal change to '1' count for each bit in the signal.
83       // Indexed by signal bit position (left-most bit first).
84       LIST<INTEGER> signal_changes_to_1;
85
86       // An array that holds the signal change to 'X' count for each bit in the signal.
87       // Indexed by signal bit position (left-most bit first).
88       LIST<INTEGER> signal_changes_to_x;
89
```

-continued

APPENDIX: Listing 1

```
90      // An array that holds the signal change to 'Z' count for each bit in the
        signal.
91      // Indexed by signal bit position (left-most bit first).
92          LIST<INTEGER> signal_changes_to_z;
93   END RECORD;
94
95
96   // Signal record lookup table.
97   GLOBAL MAP<STRING, SIGNAL_RECORD_TYPE> signal_record_table;
98
99   // Time record table.
100  GLOBAL LIST<TIME_RECORD_TYPE> time_record_table;
101
102
103  RECORD TOKEN_TYPE
104      STRING text;
105      INTEGER id;
106  END RECORD;
107
108
109  //
110  // Methods begin here.
111  // Methods are shown with arguments to convey an understanding
112  // rather than an implementation.
113  //
114
115  // Entry point for the EVICT VCD lexical analyzer, parser, compiler and
116  // data transformer.
117  METHOD main(STRING input_vcd_file, STRING output_evict_file)
118      // Local variables.
119      LOCAL FILE_TYPE input;
120      LOCAL FILE_TYPE output;
121      LOCAL TOKEN_TYPE token;
122
123      input = file_open_for_read(input_vcd_file);
124      output = file_open_for_write(output_evict_file);
125
126      FOREVER
127          token = get_next_lexical_token(input);
128          parse(token);
129          IF end_of_file(input)
130              BREAK;
131          END IF;
132      END FOREVER;
133
134      transform_data_to_evict_format_and_write_file(output);
135
136      EXIT;
137  END METHOD;
138
139
140  METHOD parse(INTEGER token)
141      LOCAL STATIC INTEGER vcd_time;
142      LOCAL STATIC STRING module;
143
144      SELECT token.id
145          CASE ___TIME___
146              vcd_time = convert_string_to_integer(token.text);
147              BREAK;
148
149          CASE ___MODULE___
150              module = token.text;
151              BREAK;
152
153          CASE ___SIGNAL___
154              store_signal_record(token, module);
155              BREAK;
156
157          CASE ___SIGNAL_VALUE___
158              store_time_record(token, vcd_time, module);
159              BREAK;
160
161      END SELECT;
162
163  END METHOD;
164
165
```

| APPENDIX: Listing 1 |
| --- |
| 166 METHOD store_signal_record(TOKEN_TYPE token, STRING module)
167     LOCAL SIGNAL_RECORD_TYPE new_record;
168
169     new_record = create_signal_record(token, module);
170     add_to_signal_record_table(new_record);
171 END METHOD;
172
173
174 METHOD store_time_record(TOKEN_TYPE token, INTEGER vcd_time, STRING module)
175     LOCAL TIME_RECORD_TYPE new_record;
176
177     IF EXISTS token.text IN signal_record_table
178         new_record = create_time_record(token, vcd_time, module);
179         add_to_time_record_table(new_record);
180     ELSE
181         ERROR EXIT;
182     END IF;
183 END METHOD;
184
185
186 METHOD transform_data_to_evict_format_and_write_file(FILE_TYPE output)
187
188     FOREACH record IN time_record_table
189         write_time_records_to_file(output);
190     END FOREACH;
191
192     FOREACH record IN signal_record_table
193         write_signal_records_to_file(output);
194     END FOREACH;
195
196 END METHOD; |

What is claimed is:

1. A method for analyzing a digital circuit design, the method comprising:

forming a record of value changes of a plurality of signals in the digital circuit design by performing a simulation simulating the digital circuit design during a simulated time interval to generate a test value change dump record, and by compiling the test value change dump record to generate the record of value changes including information about a number of value changes, during the simulated time interval, of each signal of the plurality of signals, the record of value changes further comprising, for each of the plurality of signals, a count of the number of value changes of the signal during the simulated time interval;

converting the record of value changes of the plurality of signals to a value change matrix;

transforming the value change matrix by performing dimensionality reduction to generate transformed data;

generating an enlarged data set from a first plurality of training digital circuit designs;

training an autoencoder with the enlarged data set;

copying a weight from an artificial neuron of the autoencoder to a corresponding artificial neuron of a discriminative neural network;

feeding the transformed data to the discriminative neural network; and determining, by the discriminative neural network, whether the digital circuit design has intermittent defects.

2. The method of claim 1, wherein the record of value changes further comprises, for each of the plurality of signals:

a count of the number of value changes to a value of true;
a count of the number of value changes to a value of false;
a count of the number of value changes to a value of unknown; and
a count of the number of value changes to a value of high impedance.

3. The method of claim 1, further comprising, before feeding the transformed data to the discriminative neural network, training the discriminative neural network with a plurality of training value change summary records, each of the training value change summary records corresponding to a respective one of a second plurality of training digital circuit designs, each of the training digital circuit designs being selected from:

a first set of training digital circuit designs, each of the first set of training digital circuit designs having an intermittent defect, or a second set of training digital circuit designs, each of the second set of training digital circuit designs not having any intermittent defect.

4. The method of claim 3, wherein the generating the enlarged data set is performed, before training the discriminative neural network.

5. The method of claim 4, wherein the second plurality of training digital circuit designs is the first plurality of training digital circuit designs.

6. The method of claim 4, wherein the generating of the enlarged data set comprises:

simulating each of the training digital circuit designs to form a respective one of a plurality of training value change dump records; and compiling each of the plurality of training value change dump records to form a respective one of a plurality of training value change summary records.

7. The method of claim 6, wherein the generating of the enlarged data set further comprises performing dimensionality reduction of each of the training value change summary records to form transformed data.

8. The method of claim 7, wherein the transformed data comprises a plurality of points, and wherein the generating of the enlarged data set further comprises:
for pairs of points selected from among the plurality of points, forming a plurality of randomly interpolated points, each randomly interpolated point being a weighted sum of the two points of a pair of points, at least one of weights in the weighted sum being a pseudorandom number; and
supplementing the transformed data with the randomly interpolated points.

9. The method of claim 1, further comprising:
fabricating a digital circuit based on the digital circuit design, if the digital circuit design does not have intermittent defects; and
not fabricating a digital circuit based on the digital circuit design, if the digital circuit design has intermittent defects.

10. A system for analyzing a digital circuit design, the system comprising:
a first processing circuit;
a second processing circuit; and
a third processing circuit,
the first processing circuit being configured to form a record of value changes of a plurality of signals in the digital circuit design by performing a simulation simulating the digital circuit design during a simulated time interval to generate a test value change dump record, and by compiling the test value change dump record to generate the record of value changes including information about a number of value changes, during the simulated time interval, of each signal of the plurality of signals, the record of value changes further comprising, for each of the plurality of signals, a count of the number of value changes of the signal during the simulated time interval, the first processing circuit being further configured to convert the record of value changes of the plurality of signals to a value change matrix, and to transform the value change matrix by performing dimensionality reduction to generate transformed data;
the third processing circuit being configured to:
generate an enlarged data set from a first plurality of training digital circuit designs;
train an autoencoder with the enlarged data set; and
copy a weight from an artificial neuron of the autoencoder to a corresponding artificial neuron of a first discriminative neural network; and
the second processing circuit being configured to:
instantiate the first discriminative neural network;
feed the transformed data to the first discriminative neural network; and
determine, by operating the first discriminative neural network, whether the digital circuit design has intermittent defects.

11. The system of claim 10, wherein the second processing circuit is the same processing circuit as the first processing circuit.

12. The system of claim 10, wherein the third processing circuit is configured to train a second discriminative neural network with a plurality of training value change summary records, each of the training value change summary records corresponding to a respective one of a second plurality of training digital circuit designs, each of the training digital circuit designs being selected from:
a first set of training digital circuit designs, each of the first set of training digital circuit designs having an intermittent defect, or
a second set of training digital circuit designs, each of the second set of training digital circuit designs not having any intermittent defect.

13. The system of claim 12, wherein:
the third processing circuit is the same processing circuit as the second processing circuit; or
the second discriminative neural network is the same discriminative neural network as the first discriminative neural network; or
each neuron of the first discriminative neural network has a weight that is the same as a weight of a corresponding artificial neuron of the second discriminative neural network.

* * * * *